United States Patent [19]

de Jong

[11] 4,161,030
[45] Jul. 10, 1979

[54] REGENERATING A DEGENERATED CURVE

[75] Inventor: Eduard B. M. de Jong, Tilburg, Netherlands

[73] Assignee: Technicon Instruments Corporation, Tarrytown, N.Y.

[21] Appl. No.: 815,641

[22] Filed: Jul. 14, 1977

[30] Foreign Application Priority Data

Jul. 19, 1976 [NL] Netherlands ............. 7607956

[51] Int. Cl.² .................................. G01N 21/26
[52] U.S. Cl. ................................. 364/581; 364/497; 422/68
[58] Field of Search ............. 364/581, 497; 23/230 R, 23/253 R; 356/205, 181

[56] References Cited

U.S. PATENT DOCUMENTS

| 3,572,994 | 3/1971 | Hochstrasser | 356/181 X |
| 3,784,310 | 1/1974 | Barton et al. | 356/181 |
| 3,909,136 | 9/1975 | Thomas | 356/205 X |
| 3,961,898 | 6/1976 | Neeley et al. | 356/181 X |
| 3,975,727 | 8/1976 | Mader et al. | 356/205 X |
| 4,029,416 | 6/1977 | Hawes | 356/205 X |

Primary Examiner—Edward J. Wise
Attorney, Agent, or Firm—S. P. Tedesco; Robert S. Salzman

[57] ABSTRACT

An apparatus and method for regenerating a degenerated curve, which curve has approximately degenerated exponentially. The apparatus, in part, comprises a sampler for sampling in a real time sense the points on the degenerated curve, a memory for storing the obtained samples, and an arithmetic unit for determining the points on a regenerated curve.

7 Claims, 7 Drawing Figures

REGENERATING A DEGENERATED CURVE

This invention relates to a method of regenerating a degenerated curve which curve is degenerated approximately exponentially and which comprises an interference component. The invention further relates to apparatus for carrying out said method.

Such a method and apparatus are known from Clinica Chimica Acta 36 (1972), pages 119 to 125 by W. H. C. Walker et al. In this case the apparatus is employed in a system for analysing fluid samples, in which a plurality of samples emanating from different sources, mixed with a reagent and segmented by gas bubbles and separated by segments of washing fluid also mixed with a reagent and segmented by gas bubbles, flow in order of succession through a conduit.

This continuous stream is passed through a photometric device, in which by photo-electric agency a measuring signal is produced, which is indicative of a concentration of a given component contained in the sample.

The measuring signal produced by photo-electric agency has theoretically a square wave-form with a very short rise time and also a very short decay time. The plateau of this square wave-form constitutes the indication exhibiting a fixed relationship to the concentration to be found of a given component in the sample.

However, due to turbulences, laminary streams and diffusion the measuring signal has the shape of a Gauss curve, which differs from the square wave signal.

A greater disadvantage is that due to effects in the fluid system (for example, filling phenomena in the so-called "flow cell") a further exponential deformation occurs with a time constant $b = V/F$, wherein V is the volume of the flow cell in cubic centimeters and F is the rate of flow in the supply duct in cc/sec. The measuring signal has a long rise time and also a long decay time and both at the front flank and the rear flank it varies approximately exponentially. Since the signal produced by opto-electronic agency is thus degenerated, the rate of the apparatus in analysing a sequence of fluid samples is considerably restricted, that is to say, the number of samples handled by such an apparatus in each hour is limited because the next fluid sample cannot be correctly analysed until the signal generated by the preceding fluid sample has returned to a reference level, since otherwise the measured value for the next fluid sample would be affected by the residual value of the signal of the preceding fluid sample.

From Clinica Chimica Acta 35 (1971), pages 455 to 460 by W. H. C. Walker et al it is now apparent that a definite relationship exists between the measuring signal generated by photo-electric agency and the Gauss deformed signal so that by summating the measuring signal generated by photo-electric agency and the time differential of the measuring signal generated by photo-electric agency, multiplied by a constant, the original signal, not exponentially degenerated, can be restored. For this purpose a circuit arrangement is proposed in which two differential amplifiers are used, the first as a differentiator and the second as a summating amplifier. Undesirable high-frequency components in the measuring signal are removed by using a high time constant in a differentiating network. The interference components on the differentiated signal are removed by an integrating network. The summating differential amplifier adds the differentiated measuring signal mutiplied by the time constant to the measuring signal itself.

An important disadvantage of this known apparatus resides in that the differentiating amplifier employed is a potential noise amplifier so that particularly the high-frequency interference components appear amplified at the output.

This known apparatus has furthermore the disadvantage that because the differentiated signal, flattened by using a high time constant in the differentiated network, has added to it the non-flattened, original signal interference components in the non-differentiated signal, these components will be transferred unattenuated to the regenerated signal.

This known circuit arrangement has furthermore the disadvantage that it is necessary to use a smoothing circuit in order that a differentiating amplifier amplifies any interference components on the degenerated signal for eliminating the deleterious effects of said interference components. However, this results in that the differentiating effect of the circuit is partly annulled so that the results obtained are far from optimal.

The present invention provides a method of regenerating a degenerated curve, which curve is upon approximation exponentially degenerated and includes an interference component, comprising sampling the degenerated curve, storing the samples in a memory and determining each point of the regenerated curve from the sum of a central sample, the weighted value of at least one sample preceding the central sample and the weighted value of at least one sample following the central sample. By using this method for analysing a sequence of fluid samples, interference components in particular, which are caused by the peristaltic pump used for the transport of the fluid samples through the conduits, are suppressed.

Preferably the samplings are carried out at equal time intervals.

In an embodiment of the invention to be described herein, the weight factors for the weighted values of the samplings preceding and following the central sampling are determined by the method of smallest squares.

This invention further provides apparatus for regenerating a degenerated curve, which curve is approximately degenerated exponentially and which includes an interference component, comprising a sampling means for sampling the degenerated curve, a memory for storing the samples and an arithmetic means arranged to determine each point of the regenerated curve from the sum of a central sample value, the weighted value of at least one sample preceding the central sample and the weighted value of at least one sample following the central sample.

In a further embodiment of the apparatus to be described herein, the memory comprises an analogue shift register, to the sections of which the arithmetic means is connected and to which are sequentially applied the sample values of the degenerated curve.

Preferably the arithmetic means comprises a first summating and weighting network for weighting and summating the values of the samples preceding and following the central sample with the respective weight factors, a second weighting and summating network for weighting and summating the values of the samples preceding and following the central sample with the respective weight factors, a differential amplifier determining the difference between the output signal of the first weighting and summating network and the output signal of the second weighting and summating network and a third weighting and summating network for weighting and summating the output signal of the difference amplifier with the value of the central sample.

Preferably also the weight factors of the first and the second weighting and summating networks are respectively chosen at the values 4, 3, 2, 1 for the sample values spaced apart by, respectively, 4-, 3-, 2- and 1- times the sample interval respectively before and after the central sample and in that the display factor of the third weighting and summating network is chosen to be equal to the time constant of the degenerated curve divided by a standardising factor.

Preferably the apparatus further comprises a circuit-arrangement for suppressing interference peaks including a differentiator and a gate circuit supplying an energizing signal for applying the measuring signal to the analogue shift register only when the output signal of the differentiator is within the window, whereas otherwise the preceding value of the measuring signal is reapplied to the analogue shift register.

The apparatus provided by the invention may be employed in an apparatus for analysing a sequence of fluid samples tested in a flow in a conduit for different components, a fluid sample being segmented by gas bubbles and being separated from neighbouring fluid samples by means of segments of washing fluid also segmented by means of gas bubbles, the analysis being carried out by optical means. The advantage is then obtained, at least in respect of the embodiments to be described herein, that a considerably larger number of samples per unit time can be treated, than in known analysing apparatus, the attainable factor being 3 to 4, whilst much smaller blood samples may be employed (a factor 3 to 4 smaller), which has important advantages in sampling blood from weakened or aged persons or babies.

The embodiments of apparatus to be described herein have the advantage that despite the appreciably higher analysing rate more reliable results of the analysis are obtainable because the measuring time is shorter so that drift phenomena both in the electronic system and in the chemical system have less influence. With a correct choice of the number of samples measured per unit time it is ensured under any condition that the measurements on the degenerated curve attain a reproducible value which exhibits a fixed relationship to the values of the tested concentration. An important advantage of the embodiments to be described resides in that because the measuring results are rendered directly visible by a recorder direct monitoring and hence due detection of errors are possible.

An embodiment of the invention will now be described, by way of example only, with reference to the accompanying drawings, in which.

Figure 1:
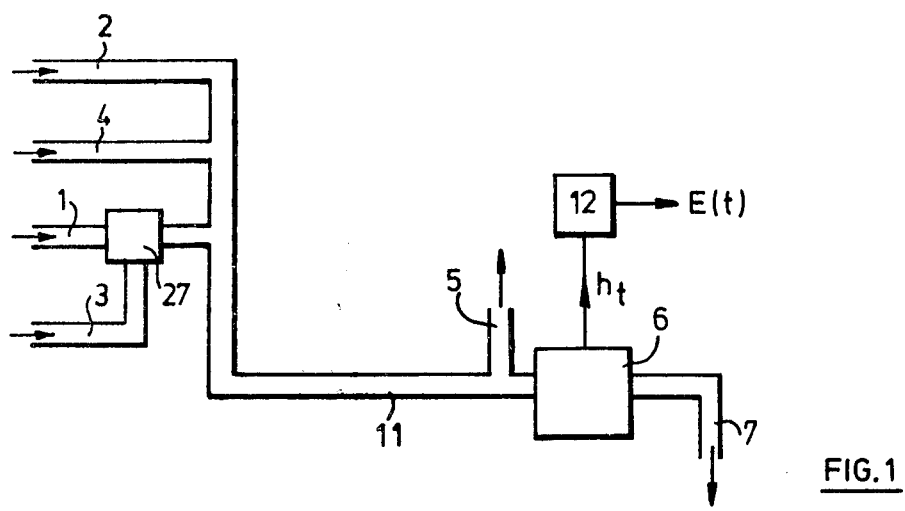
FIG. 1 shows schematically an apparatus for analysing a sequence of fluid samples, in which a curve regenerating apparatus according to the invention is employed.
Figure 2:
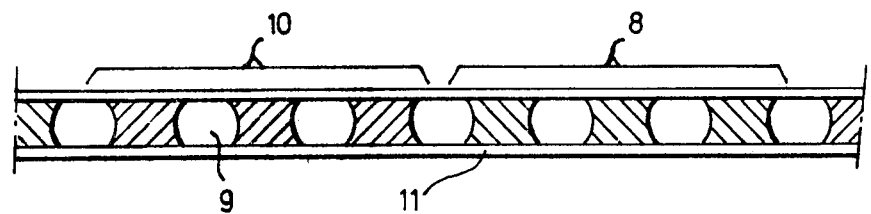
FIG. 2 shows schematically a conduit containing fluid samples, segments of flushing fluid and gas segments.
Figure 3:
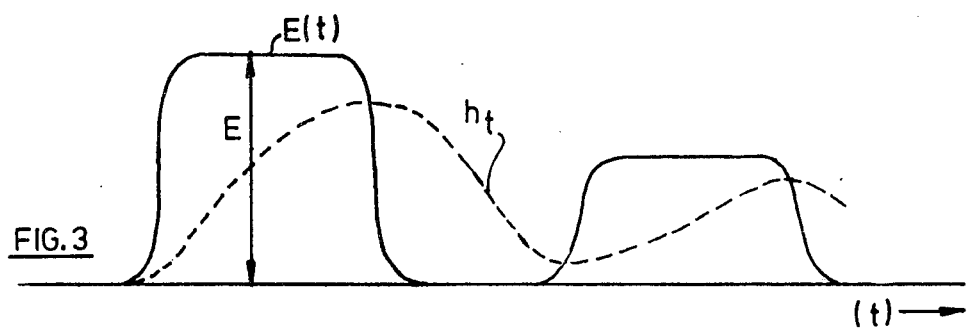
FIG. 3 shows a regenerated curve and a degenerated curve from which it has been regenerated.

FIG. 1 shows schematically the principle diagram of an apparatus for analysing a sequence of fluid samples flowing through a plurality of conduits and being examined for various constituents, a fluid sample segmented by gas bubbles being separated from neighbouring samples by means of segments of flushing fluid also segmented by gas bubbles, the analysis being carried out with the aid of analysing means. The fluid samples are supplied through a channel and sucked in by a sampler 27, which alternately supplies a sample from the channel 3 and a segment of flushing fluid from the channel 1 to the conduit 11. This fluid sample/flushing fluid stream is supplied to a stream of reagents segmented by gas bubbles, to which the reagent and the gas are supplied through the conduits 2 and 4 respectively. This gas may, in principle, be air. Thus the conditions illustrated in FIG. 2 are obtained, in which the conduit 11 contains fluid samples 8, mixed with a reagent segmented by gas bubbles 9, whilst in front of and after each fluid sample 8 a further segment of flushing fluid 10 mixed with the reagent is also segmented by gas bubbles 9. This stream of fluid samples is supplied through the conduit 11 to a measuring means 6 shown in FIG. 1, whilst shortly before the fluid samples enter the measuring means 6 through the conduit 5 the gas bubbles are removed from the stream. With the measuring means 6 is coupled an outlet conduit 7 for removing the samples. The measuring means 6 produces an output signal $h_t$, which is indicated in FIG. 3 by a broken line. This is the degenerated signal. By way of comparison FIG. 3 shows in solid lines the regenerated signal E(t). FIG. 3 indicates, moreover, the measuring value E, which has a fixed relationship to the concentration to be measured of a given constituent of the fluid.

Reference numeral 12 in FIG. 1 designates a curve regenerating apparatus embodying the invention and producing the regenerated output signal E(t).

Figure 5:
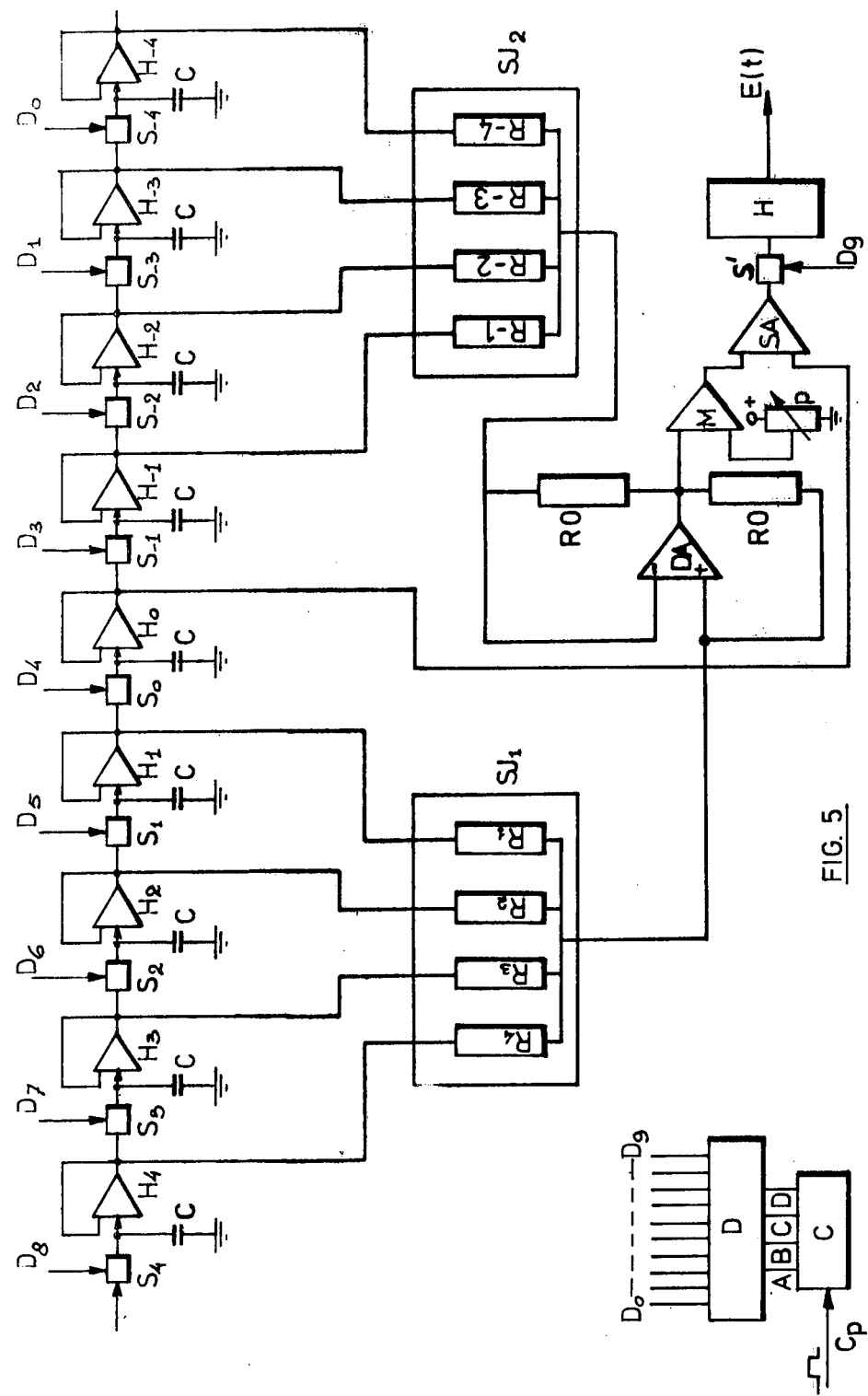
FIG. 5 shows an embodiment of curve regenerating apparatus in accordance with the invention.

Now the principles of the circuit-arrangement shown in FIG. 5 will be theoretically explained. The measuring means 6 sequentially receives different fluid samples separated by segments of flushing fluid. Due to mixing of the flushing fluid with the fluid samples, to laminary flows, to turbulence and to diffusion the signal E(t) of FIG. 3 produced, which is affected by Gauss deformation with respect to a square wave signal and which forms the desired measuring signal. By exponential deformation as a result of the above-mentioned effects the degenerated signal $h_t$ indicated in FIG. 3 is formed. The purpose is to obtain the regenerated signal E(t) by regenerating the degenerated signal $h_t$.

Be now considered a continuous flow trough (not shown) in the measuring means 6, which produces sufficient turbulences to ensure complete, instantaneous mixing of the contents. At the instant t the contents have an optical h(t) and be it assumed that in the time dt a volume fraction dv is displaced by an entering fluid having an optical density $h_0 dv$, the resulting optical density at the instant (t+dt) is equal to $$h(t+dt) = h(t)(1-dv) + E(t) + dt)dv \qquad (1)$$

It follows therefrom that:

$$dh(t)/dt = -dv/dt \{h(t)-h_0\} \quad (2)$$

If it is assumed:

$$dv/dt = 1/b \quad (3)$$

It follows therefrom:

$$b \cdot dh(t)/dt + h(t) = h_0 \quad (4)$$

This corresponds to the differential equation of an RC network with $b=RC$. $E(t)$ will then become $h_O$ and corresponds to a point or value of the regenerated curve.

From the formula (4) it appears that the regenerated signal can be obtained from the sum of the degenerated signal to which is added the differentiated, degenerated signal multiplied by the time constant of the degenerating system.

For the arithmetic treatment Clinica Chimica Acta 36 (1972), pages 119 to 125, proposes a circuit-arrangement, which has, however, the aforesaid disadvantages.

For the derivation of the equations (1) to (4) reference may be made to Clinica Chimica Acta 35 (1971), pages 455 to 460.

The invention has for its object to provide an improved calculation for the term $b \, dh(t)/dt$ in equation (4), interference components being removed as far as possible without deteriorating at the same time the information itself.

For this purpose the degenerated function is approximated by a polynomial $h(t)$ of the power n as indicated in equation (5).

$$h(t) = \sum_{k=0}^{k=n} b_{nk} t^k \quad (5)$$

The first time derivative of $h(t)$ is then $$\frac{dh(t)}{dt} = b_{n1} + 2b_{n2}t + 3b_{n3}t^2 + \cdots nb_{nn}t^n \quad (6)$$

At the instant $t=0$, this becomes:

$$(dh(t)/dt)_{t=0} = b_{n1} \quad (7)$$

For determining the first time derivative of the degenerated curve it thus appears to be only necessary to determine the coefficient $b_{n1}$. Subsequently by shifting the time axis this coefficient can be determined for any time value, this coefficient depending upon the measured values $h_t$ of the points adjacent the point for which the value of the first derivative has to be determined.

The coefficients $b_{nk}$ in equation (5) have to be determined so that the function $h(t)$ matches as far as possible the measured curve $h_t$.

For this purpose the starting point is the criterion of the lowest squares requiring that the sum of the squares of the differences between the measured values $h_t$ and the calculated values $h(t)$ should be the minimum in the interval concerned. To this end the interval $t=-m$ to $t=+m$ is considered, wherein $2m+1$ consecutive values $h_t$ are used for determining the coefficients of the polynomial (equation 5).

The criterion of the lowest squares thus requires that:

$$\frac{\delta}{\delta b_{nk}} \left\{ \sum_{t=-m}^{t=+m} (h(t)-h_t)^2 \right\} = 0 \quad (8)$$

For the coefficient $b_{n0}$ this becomes:

$$\frac{\delta}{\delta b_{n0}} \left\{ \sum_{t=-m}^{t=+m} (h(t)-h_t)^2 \right\} = \quad (9)$$
$$2 \sum_{t=-m}^{t=+m} (b_{n0} + b_{n1}t + \cdots b_{nn}t^n - h_t) = 0$$

For the coefficient $b_{n1}$ this becomes:

$$\frac{\delta}{\delta b_{n1}} \left\{ \sum_{t=-m}^{t=+m} (h(t)-h_t)^2 \right\} = \quad (10)$$
$$2 \sum_{t=-m}^{t=+m} (b_{n0} + b_{n1}t + \cdots b_{nn}t^n - h_t)t = 0$$

In general the coefficient $b_{nr}$ can be represented by:

$$\sum_{t=-m}^{t=+m} \left\{ \left( \sum_{k=0}^{k=n} b_{nk}t^k - h_t \right) t^r \right\} = 0 \quad (11)$$

wherein r denotes values from 0 to n.
Otherwise this can be written as:

$$\sum_{t=-m}^{t=+m} \sum_{k=0}^{k=n} b_{nk}t^{k+r} = \sum_{t=-m}^{t=+m} h_t t^r \quad (12)$$

Because the summations on the left-hand side of equation (12) may be exchanged and because $b_{nk}$ is independent of t, this becomes:

$$\sum_{k=0}^{k=n} b_{nk} \sum_{t=-m}^{t=+m} t^{k+r} = \sum_{t=-m}^{t=+m} h_t t^r \quad (13)$$

If it is assumed that $$S_{r+k} = \sum_{t=-m}^{t=+m} t^{r+k} \quad (14)$$

and that $$F_r = \sum_{t=-m}^{t=+m} t^r h_t \quad (15)$$

equation (13) is written as follows:

$$\sum_{k=0}^{k=n} b_{nk} S_{r+k} = F_r \quad (16)$$

This is a set of n linear equations with n unknown $(b_{nk})$.

It should be noted here that $S_{r+k}=0$ for odd values of k.

For an approximation with a polynomial of the power 2 and for $n=2$ the set of equations becomes (16).

For $r=0$ $$b_{20}S_0 + b_{21}S_1 + b_{22}S_2 = F_0 \quad (17)$$

For $r=1$
$$b_{20}S_1 + b_{21}S_2 + b_{22}S_3 = F_1 \quad (18)$$

For $r=2$ $$b_{20}S_2 + b_{21}S_3 + b_{22}S_4 = F_2 \quad (19)$$

Since $S_1$ and $S_3$ are equal to zero, it follows that $$b_{21} = \frac{F_1}{S_2} = \frac{-4h_{-4} - 3h_{-3} - 2h_{-2} - h_{-1} + h_{+1} + 2h_{+2} + 3h_{+3} + 4h_{+4}}{60} \quad (20)$$

Substitution in equation (4) results in $$E_{(t=o)} = h_o + \frac{b_{n1}}{60}(-4h_{-4} - 3h_{-3} - 2h_{-2} - h_{-1} + h_{+1} + 2h_{+2} + 3h_{+3} + 4h_{+4}) \quad (21)$$

Figure 4:
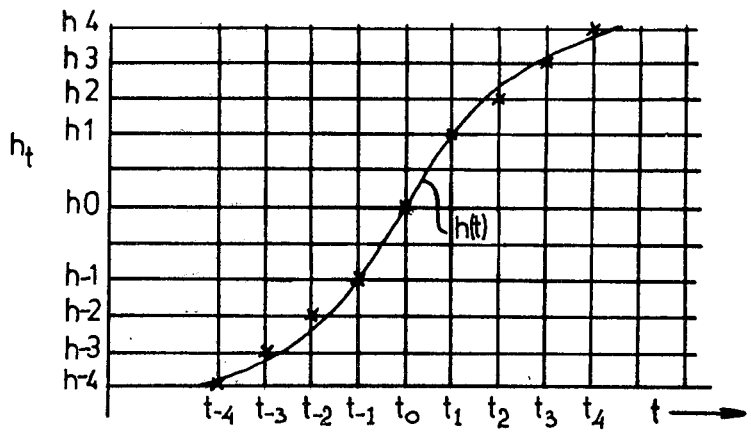
FIG. 4 is a graph with reference to which the principle of a curve regenerating apparatus in accordance with the invention will be set out more fully.

FIG. 4 indicates the various measuring points $h_t$ (t = −4, −3, −2, −1, 0, 1, 2, 3, 4) and the associated polynomial h(t).

It should be noted that though the derivation has been based on interval units for t, this is not strictly necessary, since with other intervals the weight factors and the standardising factor (the number 60 in the denominator of the right-hand side of equation (21)) also change.

FIG. 5 shows the curve regenerating apparatus for deriving a regenerated signal E(t) from a degenerated measuring signal $h_t$. It comprises analogue shift register sections $H_4$, $H_3$, $H_2$, $H_1$, $H_0$, $H_{-1}$, $H_{-2}$, $H_{-3}$, $H_{-4}$, in which are stored the values $h_4$, $h_3$, $h_2$, $h_1$, $h_0$, $h_{-1}$, $h_{-2}$, $h_{-3}$, $h_{-4}$ respectively indicated in FIG. 4. Between the shift register sections, which store an analogue value, are provided switches $S_4$, $S_3$, $S_2$, $S_1$, $S_0$, $S_{-1}$, $S_{-2}$, $S_{-3}$, and $S_{-4}$ so that the stored value of a preceding shift register section can be transferred to a next-following shift register section. To the inputs of the shift register sections $H_4$, $H_3$, $H_2$, $H_1$, $H_0$, $H_{-1}$, $H_{-2}$, $H_{-3}$, $H_{-4}$ are connected respective storage capacitors C, whilst the outputs are fed back to the inputs. The sequence of switches $S_t(t=-4-+4)$ are actuated by means of a clock supplying clock pulses CP. The outputs of the shift register section $H_4$, $H_3$, $H_2$, $H_1$ are applied to a first summating network $SJ_1$ including the resistors $R_4$, $R_3$, $R_2$ and $R_1$. The outputs of the shift register sections $H_{-1}$, $H_{-2}$, $H_{-3}$ and $H_{-4}$ are applied to the input of a second summating network $SJ_2$ including the resistors $R_{-1}$, $R_{-2}$, $R_{-3}$ and $R_{-4}$. In a preferred embodiment the ratios of the resistors $R_4$, $R_3$, $R_2$, $R_1$ and $R_{-4}$, $R_{-3}$, $R_{-2}$, $R_{-1}$ are equal to 4:3:2:1. The output signal of the summating and weighting network $SJ_2$ is applied to the inverting input of a differential amplifier DA and the output of the first summating and weighting network $SJ_1$ is applied to the second input of the differential amplifier DA.

The output signal of the differential amplifier DA is applied to the multiplying circuit M. The potentiometer P can supply the factor b divided by the normalising factor, in this case 60. The output signal of the multiplying circuit M is applied to the input of a summating amplifier SA. To the other input of the summating amplifier SA is applied the output signal of the shift register section $H_0$, that is to say the signal $h_0$. The differential amplifier DA is fed back through two feedback resistors $R_0$ to the two inputs. The output signal of the summating amplifier SA is applied through a switch S' to a hold amplifier H, which finally supplies the regenerated signal E(t).

The circuit arrangement operates as follows. At instants determined by the outputs D0–D8 of the decoder D controlled by the modulo 10 counter CO the switches S are closed as a result of which the values stored in the holding amplifiers or shift register sections H are transferred from left to right by the successive closing and opening of the switches $S_{-4}$, $S_{-3}$, $S_3$, $S_4$. At an instant determined by the output D9 of the decoder D the switch S' is closed, as a result of which the calculated signal in the summating and weighting networks $SJ_1$ and $SJ_2$, the differential amplifier DA and the summating amplifier SA is applied to the holding amplifier H, in which it is stored. By the control with the aid of the decoder D and the counter C the output signal E(t) is protected against transitional phenomena. This control-mode is otherwise not essential and other control-systems may be employed as well.

Figure 6:
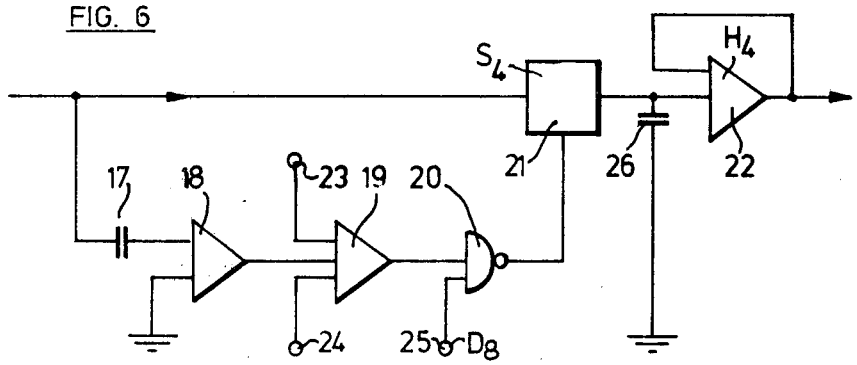
FIG. 6 shows a circuit-arrangement for suppressing interference peaks employed in the apparatus of FIG. 5.

FIG. 6 shows a circuit arrangement for suppressing interference peaks. It comprises an analogue differentiating circuit including a differential amplifier 18 and a capacitor 17. The output of the differentiating amplifier 18 is connected to a gate circuit 19, to whose terminals 23 and 24 are applied two reference signals for determining the high threshold and the low threshold (negative) of the gate. The output of the gate circuit is connected to the NAND gate 20 and it only supplies an output signal when the amplitude of the input signal lies within the window defined between the two thresholds. The other input 25 may be controlled by the output D8 of the decoder D. The output of the NAND gate 20 controls a switch 21, to which the measuring signal $h_t$ is applied. This switch 21 is connected to a holding circuit including the differential amplifier 22 and the capacitor 26. The output of the amplifier 22 is connected to the switch $S'_4$ of FIG. 5. If the differentiated value lies beyond the window, the preceding value is again supplied to the shift register.

Figure 7:
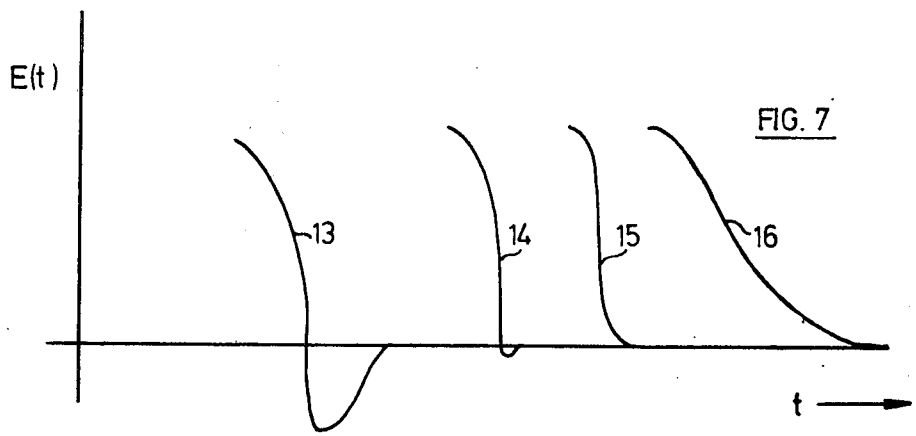
FIG. 7 shows graphs for explaining the adjustment of a given weight factor in the apparatus of FIG. 5.

FIG. 7 finally shows how in known manner the factor b can be experimentally adjusted by the potentiometer P of FIG. 5. The output signal E(t) is observed and on the basis of the resultant image the adjustment of the potentiometer can be determined. In FIG. 7 reference numeral 13 denotes the occurrence of a strong over-regeneration of the curve; reference numeral 14 designates a curve regenerated slightly too strongly; reference numeral 15 indicates a correctly regenerated curve and reference numeral 16 indicates a non-regenerated curve. The adjustment of the potentiometer P has, therefore, to be carried out so that the image of the graph 15 is obtained.

The apparatus for regenerating a degenerated curve in accordance with the invention may be successfully employed in an automatic apparatus for analysing fluid samples. The measuring signal includes a very strong interference component caused by the peristaltic pump used for the transport of the samples.

What we claim is:

1. Apparatus for regenerating a degenerated curve, which curve is approximately degenerated exponentially, comprising a sampling means for sampling in a real time sense the degenerated curve, a memory for storing the samples and an arithmetic means arranged to determine each point of the regenerated curve from the sum of a central sample value, the weighted value of at least one sample preceding the central sample and the weighted value of at least one sample following the central sample.

2. Apparatus as claimed in claim 1, in which the memory comprises an analogue shift register, said shift register having sections to which are connected the arithmetic means and to which are applied in order of succession, the sample values of the degenerated curve.

3. Apparatus as claimed in claim 2, in which the arithmetic means comprises a first summating and weighting network for weighting and summating the values of the samples preceding and following the central sample with respective weight factors, a second weighting and summating network for weighting and summating the values of the samples of the samples preceding and following the central sample with respective weight factors, a differential amplifier determining the difference between an output signal of the first weighting and summating network and an output signal of the second weighting and summating network and a third weighting and summating network for weighting and summating an output signal of the differential amplifier with a value of the central sample.

4. Apparatus as claimed in claim 3, in which the weight factors of the first and the second weighting and summating networks are respectively chosen at the values 4, 3, 2, 1 for the sample values spaced apart by, respectively, 4-, 3-, 2-, 1-times the sample interval respectively before and after the central sample and in that a display factor of the third weighting and summating network is chosen to be equal to a time constant of the degenerated curve divided by a standardizing factor.

5. Apparatus as claimed in claim 3, comprising a circuit-arrangement for suppressing interference peaks including a differentiator and a gate circuit supplying an energizing signal for applying a measuring signal to the analogue shift register only when an output signal of the differentiator is within a window, whereas otherwise a preceding value of the measuring signal is reapplied to the analogue shift register.

6. Apparatus for regenerating a degenerated curve in a real time sense to improve the reliability of analysis of said curve, said regenerating apparatus comprising:
    (1) means for sampling points associated with said degenerated curve in a real time sense,
    (2) means for storing said sampling points, and
    (3) means for processing said stored sample points for the purpose of regenerating said degenerated curve, said processing including for each stored point: obtaining a sum of each stored point, a weighted value of at least a sampled point preceding said each stored point, and a weighted value of at least a sampled point following said each stored point, whereby the determination of points of the regenerated curve is achieved.

7. Apparatus for increasing the reliability of the analysis of a plurality of successive fluid samples, said apparatus including:
    (a) means for analyzing each fluid sample in turn with respect to a particular chemical constituent;
    (b) means for generating signals in respect of said particular chemical constituent to provide a curve, said curve being degenerated; and
    (c) means for regenerating said degenerated curve in a real time sense to improve the reliability of the analysis, said regenerating means comprising:
        (1) means for sampling points associated with said degenerated curve in a real time sense,
        (2) means for storing said sample points, and
        (3) means for processing said stored sample points for the purpose of regenerating said degenerated curve, said processing including for each stored point: obtaining a sum of each stored point, a weighted value of at least a sampled point preceding said each stored point, and a weighted value of at least a sampled point following said each stored point, whereby the determination of points of the regenerated curve is achieved with respect to each fluid sample.

* * * * *

UNITED STATES PATENT AND TRADEMARK OFFICE
CERTIFICATE OF CORRECTION

PATENT NO. : 4,161,030
DATED : July 10, 1979
INVENTOR(S) : Eduard B. M. de Jong

It is certified that error appears in the above-identified patent and that said Letters Patent are hereby corrected as shown below:

Column 4, line 65, please change Equation 1 to read:

$$h(t+dt) = h(t)(1-dv) + h_o dv$$

Column 5, line 11, Please change "h0" to read $$h_o$$

[SEAL]

Signed and Sealed this

Eleventh Day of December 1979

Attest:

SIDNEY A. DIAMOND

*Attesting Officer*          *Commissioner of Patents and Trademarks*